(12) United States Patent
Li et al.

(10) Patent No.: US 12,189,868 B2
(45) Date of Patent: Jan. 7, 2025

(54) KEYBOARD AND ELECTRONIC DEVICE

(71) Applicant: Honor Device Co., Ltd., Shenzhen (CN)

(72) Inventors: Kuang Li, Shenzhen (CN); Shaohui Zhang, Shenzhen (CN)

(73) Assignee: Honor Device Co., Ltd., Shenzhen (CN)

(*) Notice: Subject to any disclaimer, the term of this patent is extended or adjusted under 35 U.S.C. 154(b) by 0 days.

(21) Appl. No.: 18/282,633

(22) PCT Filed: Apr. 29, 2022

(86) PCT No.: PCT/CN2022/090796
§ 371 (c)(1),
(2) Date: Sep. 18, 2023

(87) PCT Pub. No.: WO2023/005310
PCT Pub. Date: Feb. 2, 2023

(65) Prior Publication Data
US 2024/0176426 A1    May 30, 2024

(30) Foreign Application Priority Data
Jul. 29, 2021 (CN) .......................... 202110867785.2

(51) Int. Cl.
*G06F 3/02* (2006.01)
*G06F 1/16* (2006.01)

(52) U.S. Cl.
CPC .......... *G06F 3/0202* (2013.01); *G06F 1/1669* (2013.01)

(58) Field of Classification Search
CPC .... G06F 1/1632; G06F 1/1616; G06F 1/1656; G06F 1/1662
See application file for complete search history.

(56) References Cited

U.S. PATENT DOCUMENTS 10,782,743 B2  9/2020  Kitamura et al.
11,442,551 B2  9/2022  Liang et al.
(Continued)

FOREIGN PATENT DOCUMENTS

CN    201438292 U    4/2010
CN    101625594 B    6/2012
(Continued)

OTHER PUBLICATIONS

Jin, Guobin, "Brief review of stylish + ultra-thin design Apple G6 notebook keyboard," 12 pages, URL: http://m.zol.com.cn/article/2964378.html (May 26, 2012).
(Continued)

*Primary Examiner* — Van N Chow
(74) *Attorney, Agent, or Firm* — Leydig, Voit & Mayer, Ltd.

(57) ABSTRACT

Embodiments of this application provide a keyboard and an electronic device. The keyboard is applied to the electronic device. The keyboard includes at least the following: a keyboard assembly, including a key; and a keyboard frame assembly, including an outer metal frame, an inner metal frame, and a key avoidance hole. The inner metal frame is connected to the outer metal frame, the key avoidance hole penetrates through the outer metal frame and the inner metal frame, the keyboard assembly is connected to the inner metal frame, the inner metal frame is located between the outer metal frame and the keyboard assembly, the inner metal frame is configured to carry the keyboard assembly, and the key is disposed in correspondence with the key avoidance hole. The keyboard of this application can reduce its thickness while ensuring rigidity as required, to improve portability of the keyboard.

20 Claims, 11 Drawing Sheets

(56) References Cited

U.S. PATENT DOCUMENTS

| | | | |
|---|---|---|---|
| 2005/0270077 A1 | 12/2005 | Kwon | |
| 2006/0028793 A1* | 2/2006 | Na | G06F 1/1656 |
| | | | 361/679.27 |
| 2010/0007609 A1 | 1/2010 | Watabe et al. | |
| 2017/0277227 A1 | 9/2017 | Chou et al. | |
| 2018/0053608 A1 | 2/2018 | Liu et al. | |
| 2021/0216120 A1* | 7/2021 | Kitamura | G06F 1/203 |
| 2023/0341611 A1* | 10/2023 | Nagase | H01H 13/83 |
| 2023/0367373 A1* | 11/2023 | Lv | G06F 3/0202 |

FOREIGN PATENT DOCUMENTS

| | | | |
|---|---|---|---|
| CN | 105304387 A | 2/2016 |
| CN | 109101115 A | 12/2018 |
| CN | 110908444 A | 3/2020 |
| CN | 111403211 A | 7/2020 |
| CN | 111506202 A | 8/2020 |
| CN | 111739752 A | 10/2020 |
| CN | 212723808 U | 3/2021 |
| CN | 113778234 A | 12/2021 |
| TW | 201314723 A | 4/2013 |

OTHER PUBLICATIONS

Bring Me a Car, "MageGee Mechanical Armor 104-Key Gaming Mechanical Keyboard Pink White Light Red Switch," 18 pages, URL: http://m.smzdm.com/p/18792954/ (Jan. 24, 2020).

Jafar, "Wolf Spider detachable and washable mechanical keyboard, the patron saint of Internet cafes," 10 pages, URL: http://www.douyin.com/video/6846677252483091720 (Jul. 7, 2020).

Magegee, "#Mechanical keyboard mechanical keyboard green axis e-sports game eating chicken Internet celebrity pink office typing girl cute," 8 pages, URL: http://www.douyin.com/video/6978496994847329543 (Jun. 29, 2021).

* cited by examiner

KEYBOARD AND ELECTRONIC DEVICE

CROSS-REFERENCE TO RELATED APPLICATIONS

This application is a national stage of International Application No. PCT/CN2022/090796, filed on Apr. 29, 2022, which claims priority to Chinese Patent Application No. 202110867785.2, filed on Jul. 29, 2021, both of which are hereby incorporated by reference in their entireties.

TECHNICAL FIELD

Embodiments of this application relate to the field of terminal technologies, and in particular, to a keyboard and an electronic device.

BACKGROUND

With explosive growth of electronic devices such as a portable laptop computer, a smartphone, and a tablet computer (portable equipment, or tablet, or pad), the electronic devices have become important tools of daily work and entertainment. A user usually operates an electronic device by using a keyboard, to quickly perform an input or an output. The user has a stronger requirement for portability of the keyboard, but an overall thickness of the keyboard affects the portability of the keyboard.

In a use process of the keyboard, the keyboard needs to withstand an impact stress exerted by the user in a tapping process. To reduce a possibility that the keyboard sinks due to insufficient rigidity of the keyboard when the keyboard suffers from the impact stress in the use process, a strength enhancement mechanical part is disposed at the bottom of the keyboard, to improve a deformation resistance capability of the keyboard by using the strength enhancement mechanical part. However, the strength enhancement mechanical part added at the bottom increases the overall thickness of the keyboard. Consequently, the portability of the keyboard becomes poorer.

SUMMARY

Embodiments of this application provide a keyboard and an electronic device, so that an overall thickness of the keyboard can be reduced while it is ensured that rigidity of the keyboard meets a requirement, to improve portability of the keyboard.

A first aspect of this application provides a key board, applied to an electronic device. The keyboard includes at least the following:

a keyboard assembly, including a key; and
a keyboard frame assembly, including an outer metal frame, an inner metal frame, and a key avoidance hole, where the inner metal frame is connected to the outer metal frame, the key avoidance hole penetrates through the outer metal frame and the inner metal frame, the keyboard assembly is connected to the inner metal frame, the inner metal frame is located between the outer metal frame and the key board assembly, the inner metal frame is configured to carry the keyboard assembly, and the key is disposed in correspondence with the key avoidance hole.

According to the keyboard provided in this embodiment of this application, the inner metal frame with a strength enhancement function is disposed between the outer metal frame and the keyboard assembly. The inner metal frame and the outer metal frame are connected, and the keyboard assembly and the inner metal frame are connected. Strength enhancement is performed on the key board by using the disposed inner metal frame, to improve a deformation resistance capability of the key board, and reduce a possibility that the keyboard deforms and sinks when the keyboard suffers from an impact stress in a use process. Therefore, a metal baseplate and a plastic frame of a current keyboard can be canceled, to help reduce an overall thickness of the keyboard while it is ensured that rigidity of the keyboard meets a requirement, and improve portability of the key board.

In a possible implementation, the key board assembly is detachably connected to the inner metal frame.

In a possible implementation, the keyboard assembly further includes a circuit board unit, the key is disposed on the circuit board unit, the circuit board unit is disposed on a side that is of the inner metal frame and that faces away from the outer metal frame, and the circuit board unit is detachably connected to the inner metal frame.

In a possible implementation, the keyboard further includes an adaptation piece, and the circuit board unit is detachably connected to the inner metal frame by using the adaptation piece.

In a possible implementation, the adaptation piece includes a first component and a second component, the first component is disposed on the inner metal frame, and the first component and the second component are fastened to connect the circuit board unit and the inner metal frame.

In a possible implementation, the first component is threaded with the second component.

In a possible implementation, the first component is a nut, the inner metal frame includes a mounting hole, the first component is inserted into the mounting hole, the second component includes a bolt and a cap portion connected to the bolt, the bolt is threaded with the first component, and the cap portion abuts against the circuit board unit to apply, to the circuit board unit, a pressure stress toward the inner metal frame.

In a possible implementation, the circuit board unit includes a circuit board, a metal sheet, and a backlight module, the circuit board is disposed on a side that is of the metal sheet and that faces the inner metal frame, the backlight module is disposed on a side that is of the metal sheet and that faces away from the inner metal frame, the circuit board includes a first avoidance hole, the metal sheet includes a second avoidance hole, the backlight module includes a third avoidance hole, the first component is inserted into the first avoidance hole and the second avoidance hole, and the cap portion is accommodated in the third avoidance hole and abuts against a surface that is of the metal sheet and that faces away from the circuit board.

In a possible implementation, the inner metal frame includes a transverse spacer and a longitudinal spacer, the transverse spacer and the longitudinal spacer are alternately disposed around the key avoidance hole, and the first component is disposed in an intersection region of the transverse spacer and the longitudinal spacer.

In a possible implementation, the outer metal frame and the inner metal frame are detachably connected.

In a possible implementation, the outer metal frame includes an outer surface and an inner surface, and the inner metal frame is stuck to the inner surface.

In a possible implementation, there is an annular accommodation cavity between the inner metal frame and the inner surface, the keyboard frame assembly further includes a first adhesive member disposed within the annular accommodation cavity, the key avoidance hole is located within a region limited by the annular accommodation cavity, and the first adhesive member connects the outer metal frame and the inner metal frame.

In a possible implementation, the inner metal frame includes a transverse spacer and a longitudinal spacer, and the transverse spacer and the longitudinal spacer are alternately disposed around the key avoidance hole;

there is a first chamber between the transverse spacer and the inner surface, and the keyboard frame assembly further includes a second adhesive member disposed in the first chamber; or there is a second chamber between the longitudinal spacer and the inner surface, and the keyboard frame assembly further includes a second adhesive member disposed in the second chamber; or there is a first chamber between the transverse spacer and the inner surface, there is a second chamber between the longitudinal spacer and the inner surface, and the keyboard frame assembly further includes a second adhesive member disposed in the first chamber and the second chamber; and the second adhesive member connects the outer metal frame and the inner metal frame.

A second aspect of the embodiments of this application provides an electronic device, including the keyboard according to the foregoing embodiment.

DESCRIPTIONS OF REFERENCE NUMERALS

1: Electronic device; 11: Display; 12: Host body;
2: Keyboard;
3: Keyboard assembly; 31: Circuit board unit; 311: Circuit board; 311a: First avoidance hole; 312: Metal sheet; 312a: Second avoidance hole; 313: Backlight module;
313a: Third avoidance hole; 32: Key; 321: Scissor leg assembly; 321a: External scissor leg; 321b: Inner scissor leg; 322: Keycap;
4: Keyboard frame assembly; 41: Outer metal frame; 41a: First opening; 41b: Outer surface; 41c: Inner surface; 41d: Accommodation concave part; 411: First board; 412: First side plate; 42: Inner metal frame; 42a: Second opening; 42b: Annular groove; 421: Transverse spacer; 421a: First concave part; 422: Longitudinal spacer; 422a: Second concave part; 423: Second board; 424: Second side plate; 425: Flange 43; Key avoidance hole;
5: Adaptation piece; 51: First component; 511: Tooth portion; 52: Second component; 521: Bolt; 522: Cap portion;
6: First adhesive member;
7: Second adhesive member;
X: Length direction;
Y: Width direction; and
Z: Thickness direction.

DESCRIPTION OF EMBODIMENTS

An embodiment of this application provides an electronic device 1. The electronic device 1 may be a mobile terminal such as a desktop computer, a laptop computer (laptop), a tablet computer (tablet), an ultra-mobile personal computer (UMPC), a handheld computer, a walkie-talkie, a netbook, a POS machine, or a personal digital assistant (PDA), a fixed terminal, or a foldable device.

Figure 1:
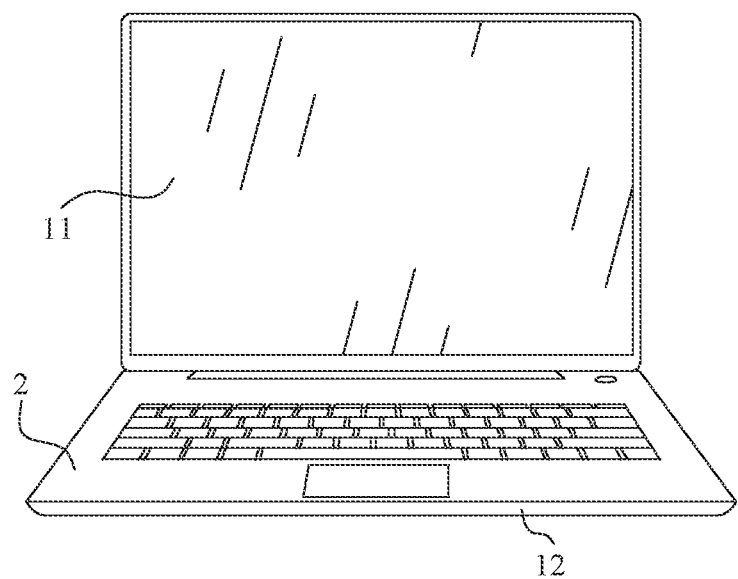
FIG. 1 is a schematic diagram of a structure of an electronic device according to an embodiment of this application.

FIG. 1 schematically shows a three-dimensional structure of an electronic device 1 according to an embodiment. Referring to FIG. 1, in this embodiment of this application, an example in which the electronic device 1 is a laptop computer is used for description. The electronic device 1 may include a display 11 and a host body 12. The display 11 may be rotatably connected to the host body 12. For example, the display 11 and the host body 12 may be connected by using a rotating shaft; or the display 11 and the host body 12 may be rotatably connected by using a hinge structure. Alternatively, in some examples, the display 11 and the host body 12 may be mutually independent devices. For example, the display 11 and the host body 12 are detachable. When being used, the display 11 is placed on the host body 12, and after the use, the display 11 and the host body 12 may be separated from each other.

It should be noted that, to implement a display effect of the display 11, the display 11 is electrically connected to the host body 12. For example, the display 11 may be electrically connected to the host body 12 by using a contact, or the display 11 is electrically connected to the host body 12 by using a flexible circuit board (Flexible Printed Circuit, or FPC), or the display 11 is electrically connected to the host body 12 by using a wire. In addition, alternatively, the display 11 may be wirelessly connected to the host body 12 by using a wireless signal.

Referring to FIG. 1, to implement an input to the electronic device 1, the electronic device 1 may further include a keyboard 2. The keyboard 2 may be disposed on the host body 12. The key board 2 is electrically connected to a control unit in the host body 12. The key board 2 serves as an input device of the electronic device 1. The keyboard 2 may be used to enter a character or an operation instruction by using a key, and may further control a cursor to move.

Currently, the keyboard includes an outer metal frame, a plastic frame, a key board assembly, and a metal baseplate. The plastic frame is formed on the outer metal frame of the keyboard by using an injection molding process. The keyboard assembly is disposed between the outer metal frame and the metal baseplate. Both the keyboard assembly and the metal baseplate are attached to the plastic frame. The plastic frame carries the keyboard assembly and metal baseplate. A solder column protrudes from the plastic frame. The solder column penetrates through mounting holes of the keyboard assembly and the metal baseplate. An end portion that is of the solder column and that penetrates through the metal baseplate deforms through hot melting or pressing, and is clamped on a bottom surface that is of the metal baseplate and that faces away from the outer metal frame, to connect the keyboard assembly, the metal baseplate, and the plastic frame. The metal baseplate may serve as a strength enhancement structure, to improve overall rigidity of the keyboard, so as to resolve a problem that the outer metal frame sinks due to insufficient rigidity when the outer metal frame is pressed. However, the plastic frame and the metal baseplate lead to a large overall thickness of the key board. Consequently, portability of the key board is poor.

Based on the foregoing found problem, an embodiment of this application provides a key board 2. An inner metal frame 42 is disposed between a key board assembly 3 and an outer metal frame 41, and the inner metal frame 42 carries the key board assembly 3. In addition, the inner metal frame 42 has a strength enhancement function, to improve overall rigidity of the keyboard 2. Therefore, a plastic frame and a metal baseplate in the keyboard can be canceled, to effectively reduce an overall thickness of the keyboard 2, reduce a weight of the key board 2, and help improve portability of the keyboard 2.

An implementation of the keyboard 2 provided in the embodiments of this application is described below.

Figure 2:
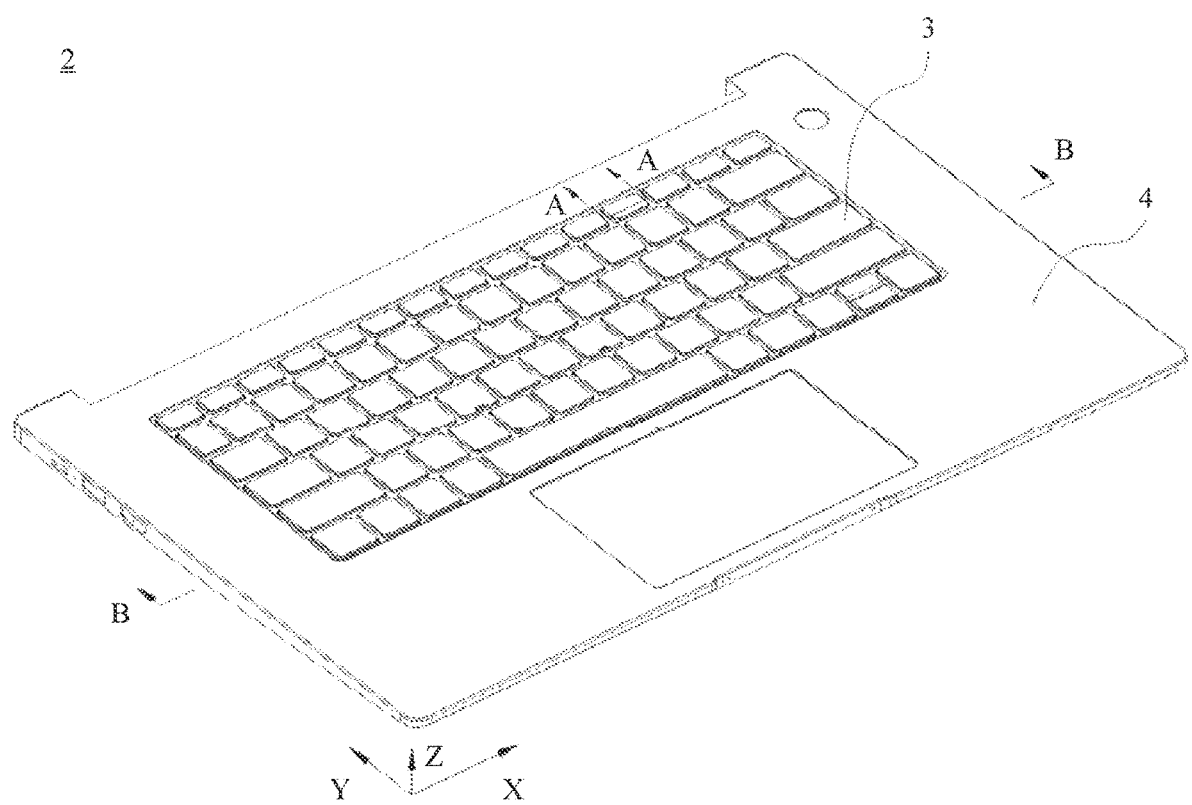
FIG. 2 is a schematic diagram of a structure of a keyboard according to an embodiment of this application.

FIG. 2 schematically shows a structure of a keyboard according to an embodiment of this application. Referring to FIG. 1 and FIG. 2, a keyboard 2 in this embodiment of this application includes a keyboard assembly 3 and a keyboard frame assembly 4. The keyboard assembly 3 is connected to the keyboard frame assembly 4. The keyboard frame assembly 4 is configured to carry the key board assembly 3, or provide protection for the key board assembly 3 on an outer side of the keyboard assembly 3.

Figure 3:
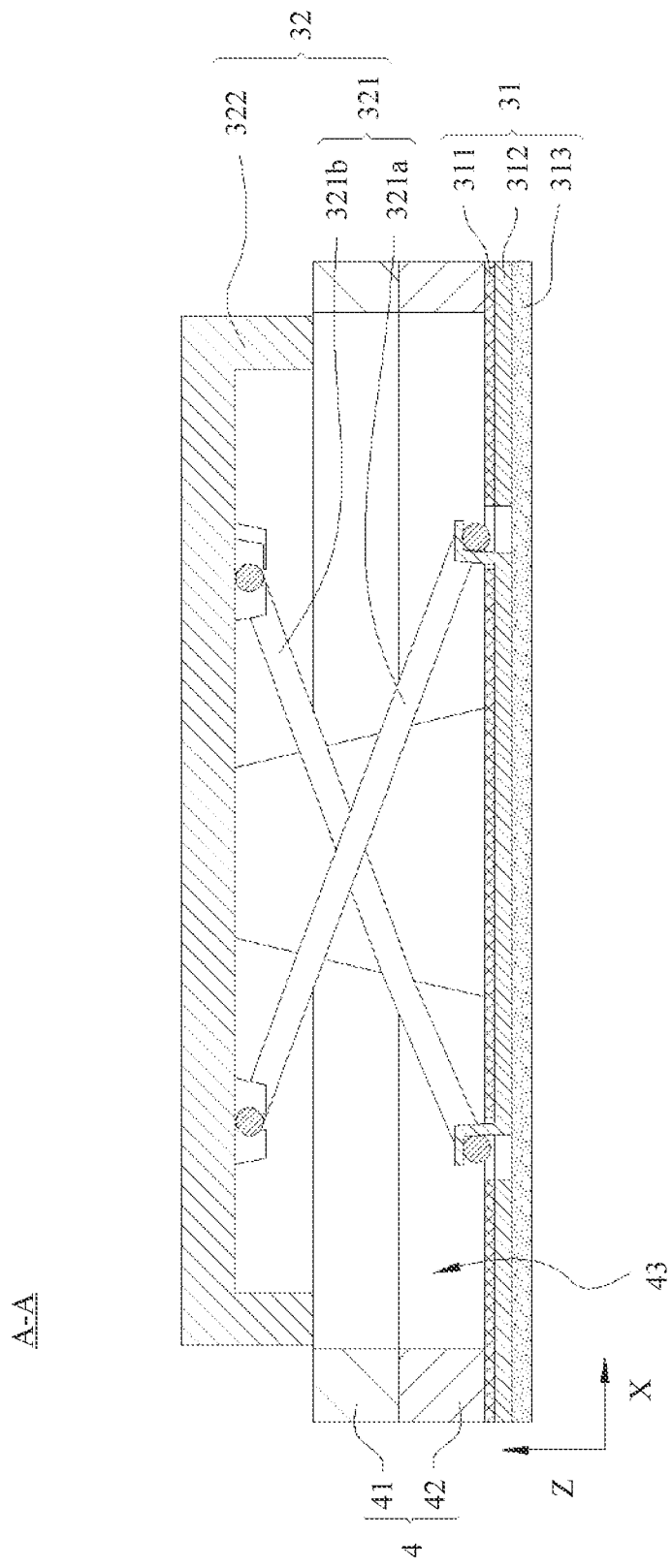
FIG. 3 is a schematic diagram of a cross-sectional structure in an A-A direction in FIG. 2.

Referring to FIG. 2 and FIG. 3, the key board assembly 3 in this embodiment of this application includes a circuit board unit 31 and a plurality of keys 32 disposed on the circuit board unit 31. The circuit board unit 31 and the keys 32 are stacked in a thickness direction Z of the keyboard 2. The circuit board unit 31 may provide support for each key 32. For a type of the keys 32, refer to an existing key. For example, the plurality of keys 32 include a numeric key, a function key (for example, a Delete key or an Insert key), and a letter key. The keys 32 may be classified into a single-unit key and a multi-unit key based on sizes of the keys. The single-unit key is a square key 32 on the keyboard 2, for example, a key 32 corresponding to each letter or each number. The multi-unit key is a key 32 other than the single-unit key, for example, a Space key, an Enter key, or a Shift key.

The circuit board unit 31 includes a circuit board 311, a metal sheet 312, and a backlight module 313. The circuit board 311, the metal sheet 312, and the backlight module 313 are stacked in the thickness direction Z of the keyboard 2. The circuit board 311 is located on a side that is of the metal sheet 312 and on which the key 32 is disposed, and the backlight module 313 is located on a side that is of the metal sheet 312 and that faces away from the key 32. The metal sheet 312 can effectively improve a deformation resistance capability of the circuit board unit 31, to reduce a possibility that the circuit board 311 is broken when being bent or pulled. For example, the circuit board 311 may be a flexible circuit board. A material of the metal sheet 312 may be steel, aluminum, or an aluminum alloy. For example, the metal sheet 312 may be a steel sheet. A thickness of the metal sheet 312 is 0.3 millimeter to 0.4 millimeter.

The key 32 includes a scissor leg assembly 321 and a keycap 322. The scissor leg assembly 321 is separately rotatably connected to the keycap 322 and the metal sheet 312. The scissor leg assembly 321 is disposed below the keycap 322. The scissor leg assembly 321 is configured to provide good support for the keycap 322, so that a pressure stress exerted on the keycap 322 can be balanced, and a user can press the keycap 322 at any location on the keycap 322 by exerting fixed pressure, to reduce a possibility that the keycap 322 withstands uneven pressure or a key is stuck. For example, one or more scissor leg assemblies 321 may be disposed below one keycap 322. For example, the scissor leg assembly 321 includes an outer scissor leg 321a and an inner scissor leg 321b. The outer scissor leg 321a and the inner scissor leg 321b intersect with each other and are rotatably connected. Respective lower ends of the outer scissor leg 321a and the inner scissor leg 321b are rotatably connected to the metal sheet 312. Respective upper ends of the outer scissor leg 321a and the inner scissor leg 321b are rotatably connected to the keycap 322. In some examples, the outer scissor leg 321a and the inner scissor leg 321b each may be of a box structure.

The backlight module 313 may be configured to provide backlight for the key 32, so that in an environment with dark light, the user can clearly observe a corresponding key 32, to reduce a possibility that the key 32 is wrongly operated, and improve input accuracy and input efficiency.

In some implementable manners, the backlight module 313 includes a light guide board (not shown in the figure) and a light-emitting unit (not shown in the figure). The light guide board has light guiding and light uniformization functions. The backlight module 313 may display the backlight by using the light guide board, to illuminate the key 32 in a corresponding region. The light emitting unit is configured to emit light into the light guide board. The light emitting unit may be disposed at a location near an edge of the light guide board. After being lit, the light emitting unit emits light into the light guide board. After the light is uniformized by the light guide board, a region of the 32 keys is illuminated. For example, the light emitting unit may be an LED lamp.

The circuit board unit 31 and the key 32 of the keyboard assembly 3 may be assembled to form a whole, and then are assembled with the keyboard frame assembly 4 to form the keyboard 2.

Figure 4:
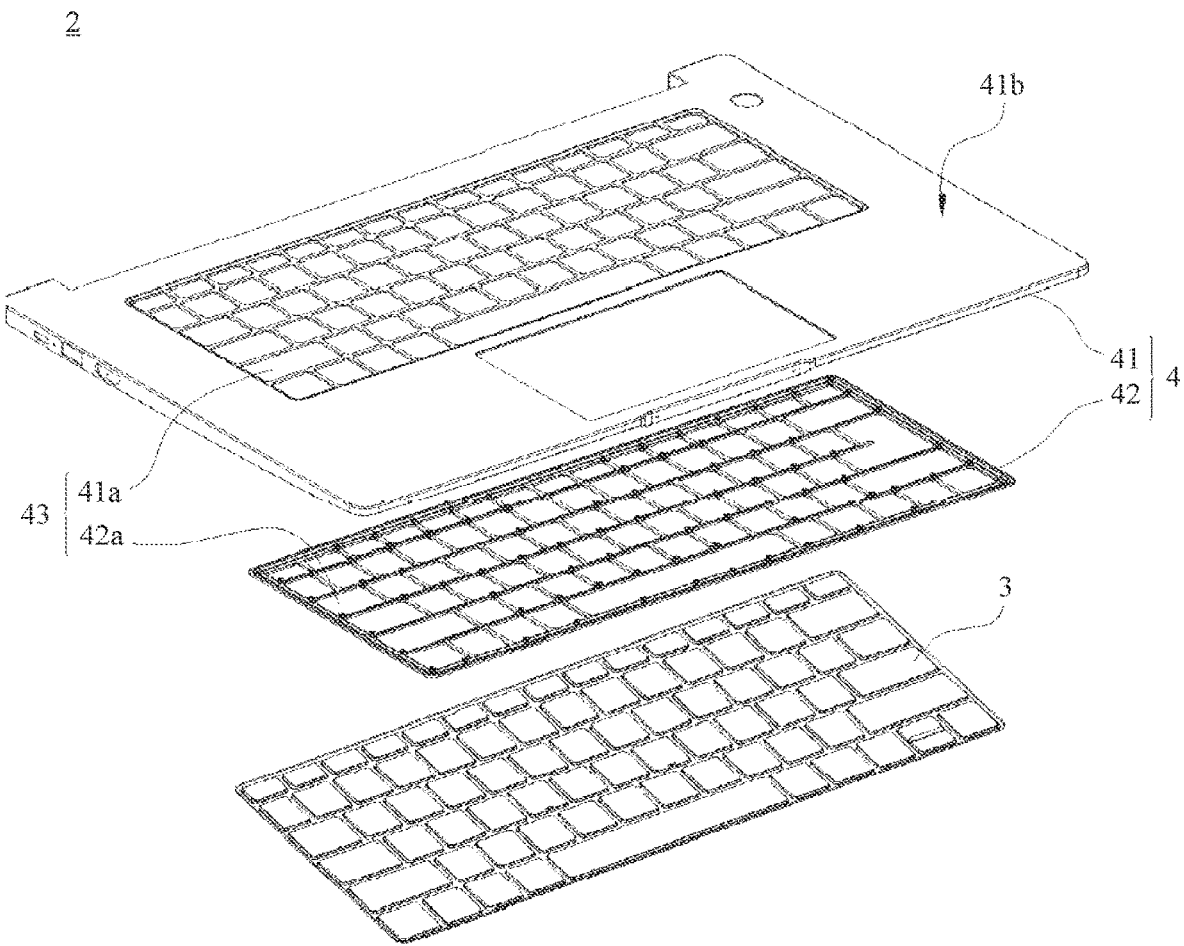
FIG. 4 is a schematic diagram of a partial exploded structure of a keyboard according to an embodiment of this application.
Figure 5:
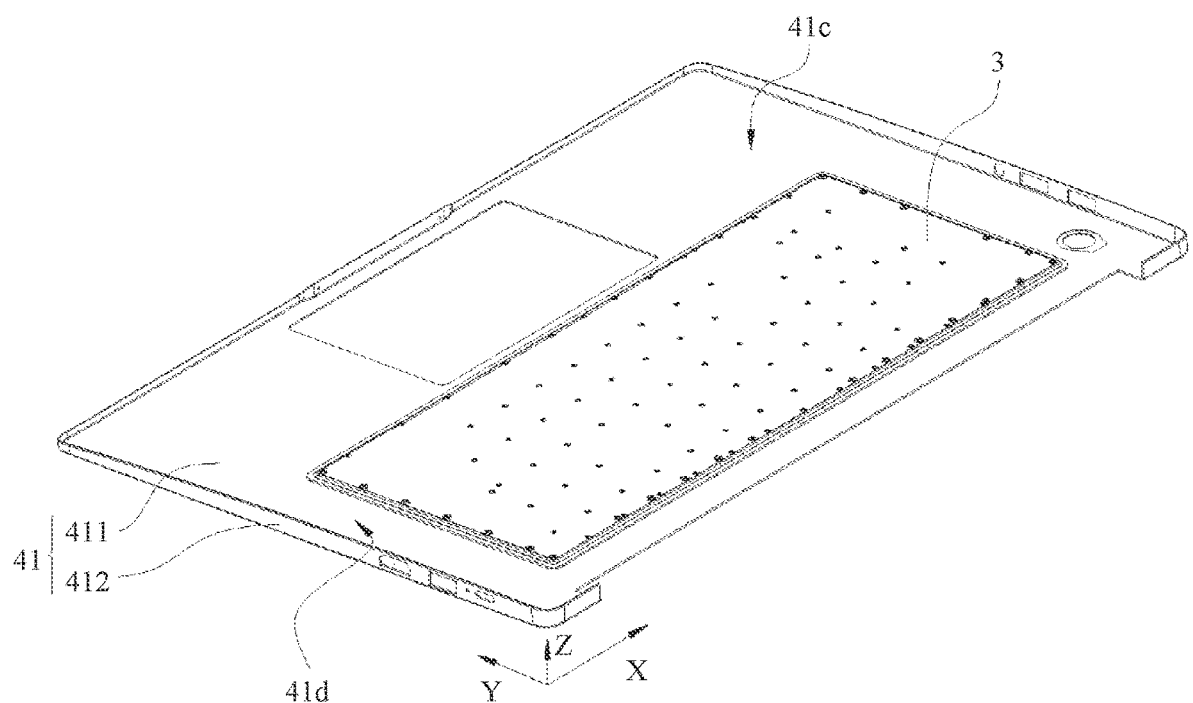
FIG. 5 is a schematic diagram of a rear-side structure of a keyboard according to an embodiment of this application.

FIG. 4 schematically shows a partial exploded structure of a keyboard 2 according to an embodiment of this application. FIG. 5 schematically shows a rear-side structure of a key board 2 according to an embodiment of this application. Referring to FIG. 4 and FIG. 5, the keyboard frame assembly 4 in this embodiment of this application includes an outer metal frame 41, an inner metal frame 42, and a key avoidance hole 43. The inner metal frame 42 is connected to the outer metal frame 41. The key avoidance hole 43 penetrates through the outer metal frame 41 and the inner metal frame 42. The keyboard assembly 3 is connected to the inner metal frame 42. The inner metal frame 42 is located between the outer metal frame 41 and the keyboard assembly 3. The inner metal frame 42 is configured to carry the keyboard assembly 3. The key 32 is disposed in correspondence with the key avoidance hole 43, so that the key 32 may be exposed from the key avoidance hole 43, and the user taps the key 32 to execute an input instruction.

The outer metal frame 41 may be of an integral structure, to help improve rigidity and a deformation resistance capability of the outer metal frame 41 while it is ensured that the outer metal frame 41 is lightweighted. The outer metal frame 41 may be processed and manufactured in a processing manner such as stamping, die casting, or model casting. A material of the outer metal frame 41 may be aluminum, an aluminum alloy, or steel. The outer metal frame 41 is provided with a first opening 41a used to avoid the key 32. The key avoidance hole 43 includes the first opening 41a. The outer metal frame 41 includes an outer surface 41b and an inner surface 41c that are opposite to each other. The first opening 41a penetrates through the outer surface 41b and the inner surface 41c. It should be noted that the outer surface 41b of the outer metal frame 41 is a surface that is of the outer metal frame 41 and that faces the user when the user uses the keyboard 2. The inner surface 41c of the outer metal frame 41 is a surface that is of the outer metal frame 41 and that faces an inside of the keyboard 2 when the user uses the keyboard 2. In this case, the user cannot easily observe the inner surface 41c of the outer metal frame 41 from an outside of the keyboard 2.

The inner metal frame 42 is disposed on an inner side of the outer metal frame 41. The inner metal frame 42 may be connected to the inner surface 41c of the outer metal frame 41. The inner metal frame 42 may perform strength enhancement on the outer metal frame 41, to help reduce a possibility that the outer metal frame 41 sinks under pressure. The inner metal frame 42 may be of an integral structure, to help improve rigidity and a deformation resistance capability of the inner metal frame 42 while it is ensured that the inner metal frame 42 is lightweighted. The inner metal frame 42 may be processed and manufactured in a processing manner such as stamping, die casting, or model casting. For example, the inner metal frame 42 may be formed by stamping a flat plate. A material of the inner metal frame 42 may be aluminum, an aluminum alloy, or steel. The inner metal frame 42 is provided with a second opening 42a used to avoid the key 32. The key avoidance hole 43 includes the second opening 42a. For example, the first opening 41a and the second opening 42a are aligned and communicate to form the key avoidance hole 43.

Figure 6:
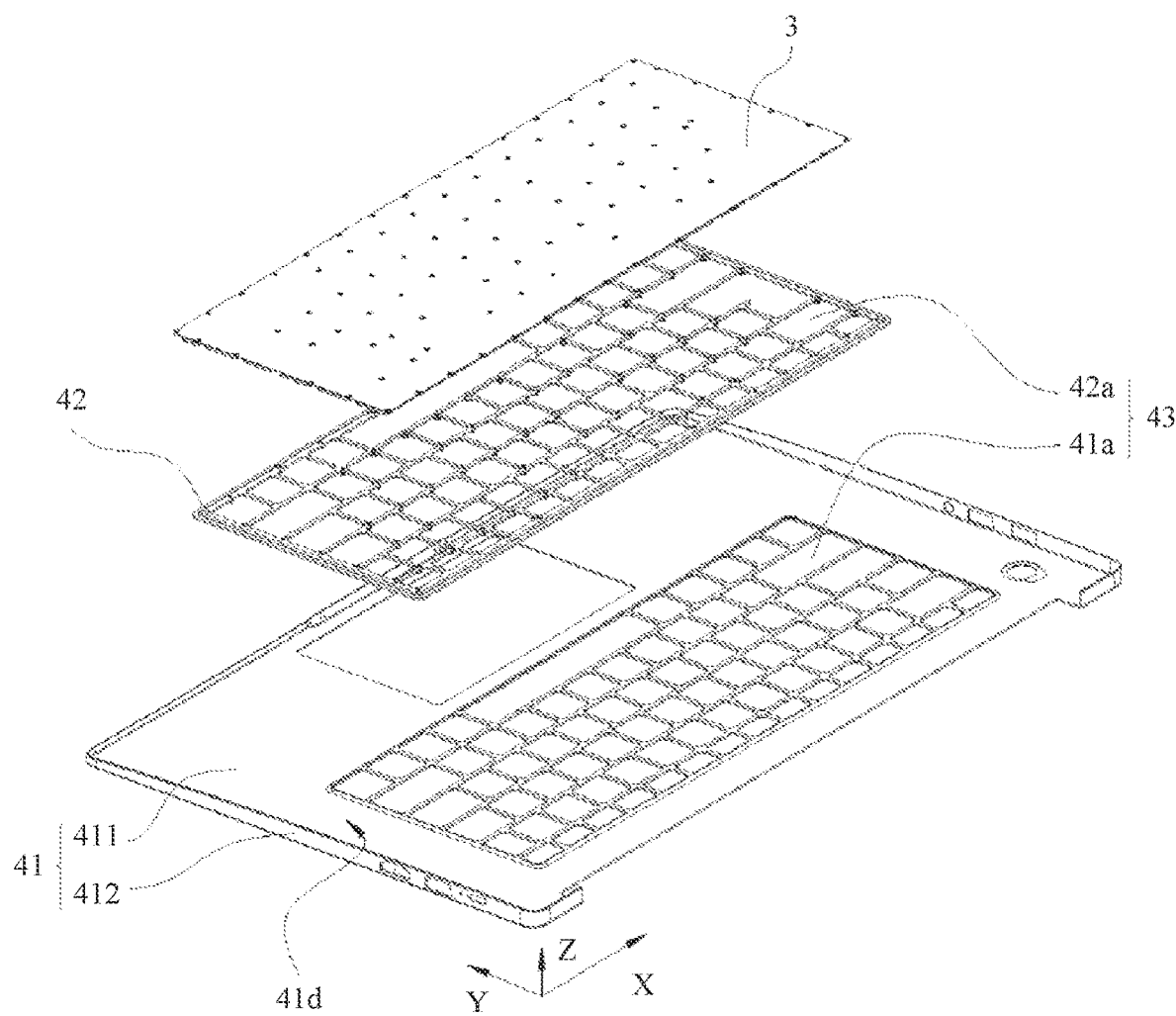
FIG. 6 is a schematic diagram of a partial exploded structure of a keyboard according to another embodiment of this application.

FIG. 6 schematically shows a partial exploded structure of a keyboard according to an embodiment of this application. Referring to FIG. 5 and FIG. 6, in some implementable manners, the outer metal frame 41 includes a first board 411 and a first side plate 412. The first board 411 and the first side plate 412 intersect to form an accommodation concave part 41d. The first opening 41a is disposed on the first board 411. A heat dissipation hole may be disposed on the first side plate 412. The inner metal frame 42 is located in the accommodation concave part 41d. In the thickness direction Z of the keyboard 2, the inner metal frame 42 and the first board 411 are stacked and connected to the first board 411.

The keyboard assembly 3 is connected to the inner metal frame 42, so that the inner metal frame 42 can carry the keyboard assembly 3. The keyboard assembly 3 is suspended below the inner metal frame 42. When the user taps the key 32, after a force is exerted on the keyboard assembly 3, the keyboard assembly 3 applies, to the inner metal frame 42, a tensile stress that is away from the outer metal frame 41, and the inner metal frame 42 applies, to the outer metal frame 41, a tensile stress that faces away from the inner surface 41c of the outer metal frame 41. The inner metal frame 42 and the outer metal frame 41 are combined with each other, and the inner metal frame 42 has high rigidity and has a strength enhancement function. Therefore, when an external force is exerted on the keyboard assembly 3, the keyboard assembly 3 does not easily deform or sink, and the keyboard assembly 3 does not easily pull the inner metal frame 42 and the outer metal frame 41 to deform or sink.

In the keyboard 2 in this embodiment of this application, the inner metal frame 42 with the strength enhancement function is disposed between the outer metal frame 41 and the keyboard assembly 3. The inner metal frame 42 is connected to the outer metal frame 41, and the keyboard assembly 3 is connected to the inner metal frame 42. Strength enhancement is performed on the keyboard 2 by using the disposed inner metal frame 42, to improve a deformation resistance capability of the keyboard 2, and reduce a possibility that the key board 2 deforms and sinks when the keyboard 2 suffers from an impact stress in a use process. Therefore, a metal baseplate and a plastic frame of a current keyboard can be canceled, to help reduce an overall thickness of the keyboard 2 while it is ensured that rigidity of the key board 2 meets a requirement, and improve portability of the keyboard 2.

In the current keyboard, a solder column protrudes from the plastic frame. An end portion that is of the solder column and that penetrates through the metal baseplate deforms through hot melting or pressing, and is clamped on a bottom surface of the metal baseplate, to connect the keyboard assembly, the metal baseplate, and the plastic frame. In such a structure design, when the key board assembly needs to be repaired due to a fault, the keyboard assembly and the plastic frame can be separated only after the end portion of the solder column is cut off. Consequently, the plastic frame cannot be reused. The plastic frame and the outer metal frame are both scrapped. In this embodiment of this application, the keyboard assembly 3 is detachably connected to the inner metal frame 42, so that the keyboard assembly 3 can be removed from the inner metal frame 42 when the keyboard assembly 3 needs to be repaired. After the keyboard assembly 3 is repaired, the keyboard assembly 3 is reinstalled on the inner metal frame 42, so that the inner metal frame 42 and the outer metal frame 41 can be reused, thereby reducing maintenance difficulty and maintenance costs. For example, the keyboard assembly 3 and the inner metal frame 42 may be stuck by using an adhesive member. Alternatively, the keyboard assembly 3 and the inner metal frame 42 may be snap-fitted by using a snap-fit. Alternatively, the keyboard assembly 3 and the inner metal frame 42 may be fastened by using a fastener. For example, the fastener may be a screw.

The key board assembly 3 includes the circuit board unit 31. The key 32 is disposed on the circuit board unit 31. The circuit board unit 31 provides support for the key 32. The circuit board unit 31 is disposed on a side that is of the inner metal frame 42 and that faces away from the outer metal frame 41. The circuit board unit 31 is detachably connected to the inner metal frame 42. The circuit board unit 31 is of a plate-like structure and has high rigidity. Therefore, the circuit board unit 31 is connected to the inner metal frame 42, to effectively ensure stability and reliability of a connection between the circuit board unit 31 and the inner metal frame 42, and reduce a possibility that the key board assembly 3 and the inner metal frame 42 are loosened or separated due to frequent tapping. For example, the circuit board unit 31 includes the circuit board 311, the metal sheet 312, and the backlight module 313. The circuit board 311 is disposed on a side that is of the metal sheet 312 and that faces the inner metal frame 42. The circuit board 311 may be a printed circuit board (PCB) or a flexible circuit board. The backlight module 313 is disposed on a side that is of the metal sheet 312 and that faces away from the inner metal frame 42. The circuit board 311 has signal collection and signal processing functions. When the key 32 is tapped, a corresponding region of the circuit board 311 is triggered to execute a corresponding input instruction. The metal sheet 312 of the circuit board unit 31 is detachably connected to the inner metal frame 42. Light of the backlight module 313 may penetrate through the metal sheet 312 and the circuit board 311 and illuminate the key 32.

Figure 7:
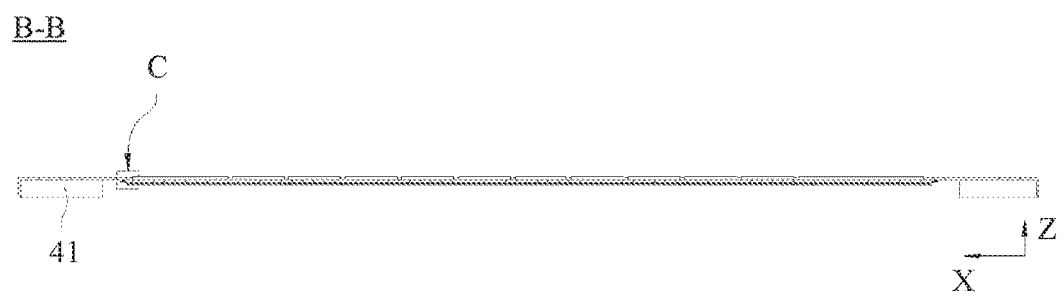
FIG. 7 is a schematic diagram of a cross-sectional structure in a B-B direction in FIG. 2.
Figure 8:
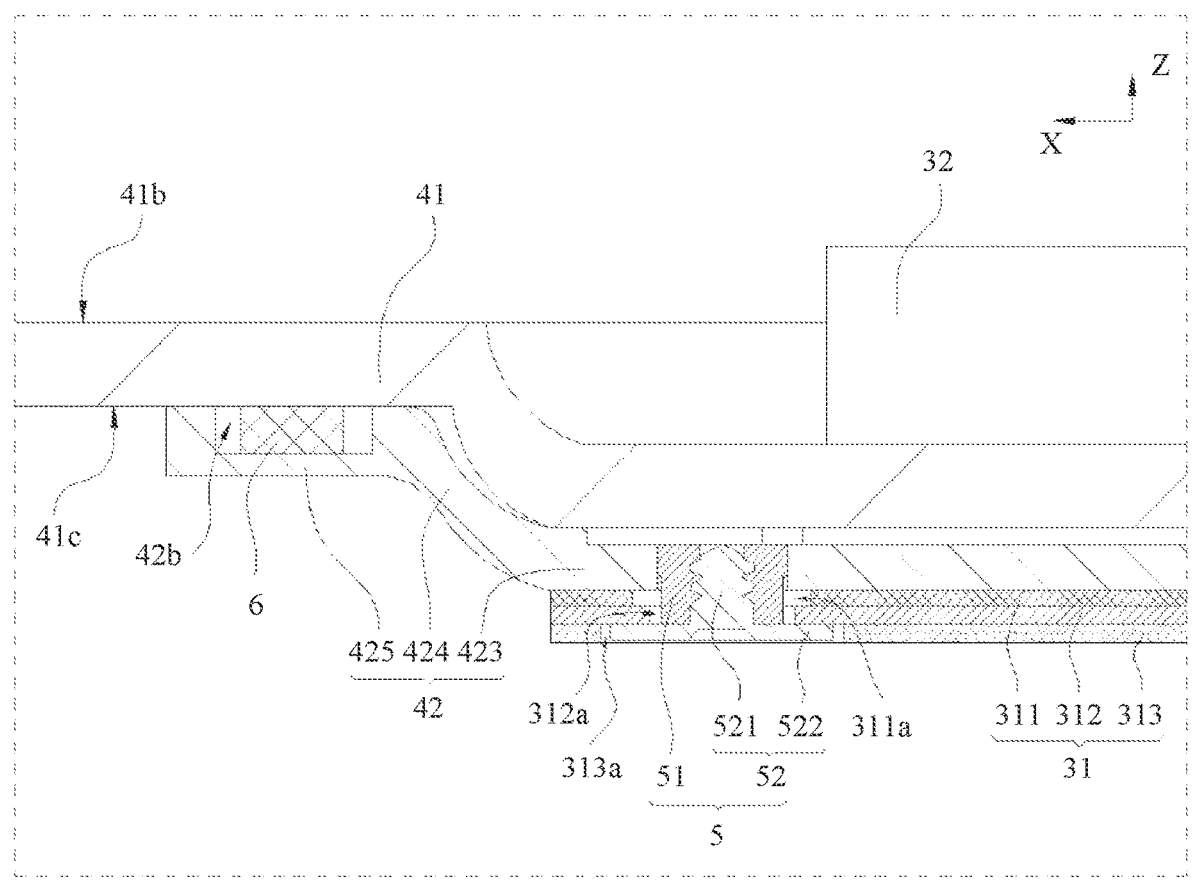
FIG. 8 is an enlarged schematic diagram of a location C in FIG. 7.

Referring to FIG. 7 and FIG. 8, the keyboard 2 in this embodiment of this application further includes an adaptation piece 5. The circuit board unit 31 is detachably connected to the inner metal frame 42 by using the adaptation piece 5. For example, a part of the adaptation piece 5 is connected to the circuit board unit 31, and the other part is connected to the inner metal frame 42, so that the circuit board unit 31 is pressed against a surface that is of the inner metal frame 42 and that faces the circuit board unit 31. In a manner in which the circuit board unit 31 and the inner metal frame 42 are connected by using the adaptation piece 5, no connection structure needs to be additionally disposed on the circuit board unit 31 or the inner metal frame 42 in an integrated manner, to help reduce processing and manufacturing difficulty of the circuit board unit 31 and the inner metal frame 42. When the keyboard assembly 3 needs to be repaired, the adaptation piece 5 may be removed to separate the keyboard assembly 3 and the inner metal frame 42.

In some implementable manners, the adaptation piece 5 includes a first component 51 and a second component 52. The first component 51 and the second component 52 are independently disposed. After the first component 51 and the second component 52 are separately processed and manufactured, the first component 51 and the second component 52 may be connected to each other to form the adaptation piece 5. The first component 51 is disposed on the inner metal frame 42. The first component 51 may be detachably connected to the inner metal frame 42. After the inner metal frame 42 and the outer metal frame 41 are assembled, the first component 51 is connected to the inner metal frame 42. Alternatively, the first component 51 is connected to the inner metal frame 42 in advance, and then the inner metal frame 42 with the first component 51 is connected to the outer metal frame 41. Alternatively, the first component 51 may be directly built into or soldered onto the inner metal frame 42 to form an integral structure with the inner metal frame 42. Before the inner metal frame 42 and the outer metal frame 41 are assembled, the first component 51 is built into or soldered onto the inner metal frame 42, and then the inner metal frame 42 is connected to the outer metal frame 41. Therefore, in a process of connecting the inner metal frame 42 and the outer metal frame 41, the first component 51 is not easily separated from the inner metal frame 42 and lost. After being positioned, the keyboard assembly 3 and the inner metal frame 42 are connected by using the second component 52 and the first component 51. The first component 51 and the second component 52 are fastened to connect the circuit board unit 31 and the inner metal frame 42. The first component 51 and the second component 52 that are separately designed are used for the adaptation piece 5, so that the first component 51 is positioned and mounted on the inner metal frame 42 in advance, and then the key board assembly 3 is fastened by using the second component 52. Therefore, the second component 52 may be directly aligned with the first component 51 to perform a connection operation, and the second component 52 does not need to be repositioned with respect to the inner metal frame 42.

The first component 51 is threaded with the second component 52. One of the first component 51 and the second component 52 has an external thread, and the other has an internal thread. When the second component 52 is connected to the first component 51, the threads may guide the second component 52 to be aligned with the first component 51, to reduce difficulty in positioning the first component 51 and the second component 52 in alignment with each other, and help improve connection convenience and connection efficiency. After the first component 51 and the second component 52 are connected, the first component 51 and the second component 52 are easily self-locked, and have good anti-loosening performance and connection stability, to reduce a probability that a gap occurs between the key board assembly 3 and the inner metal frame 42 after the first component 51 and the second component 52 are mutually loosened after long-term use, and the keyboard assembly 3 becomes loose, affecting stability and comfort of tapping the key 32 by the user.

Figure 9:
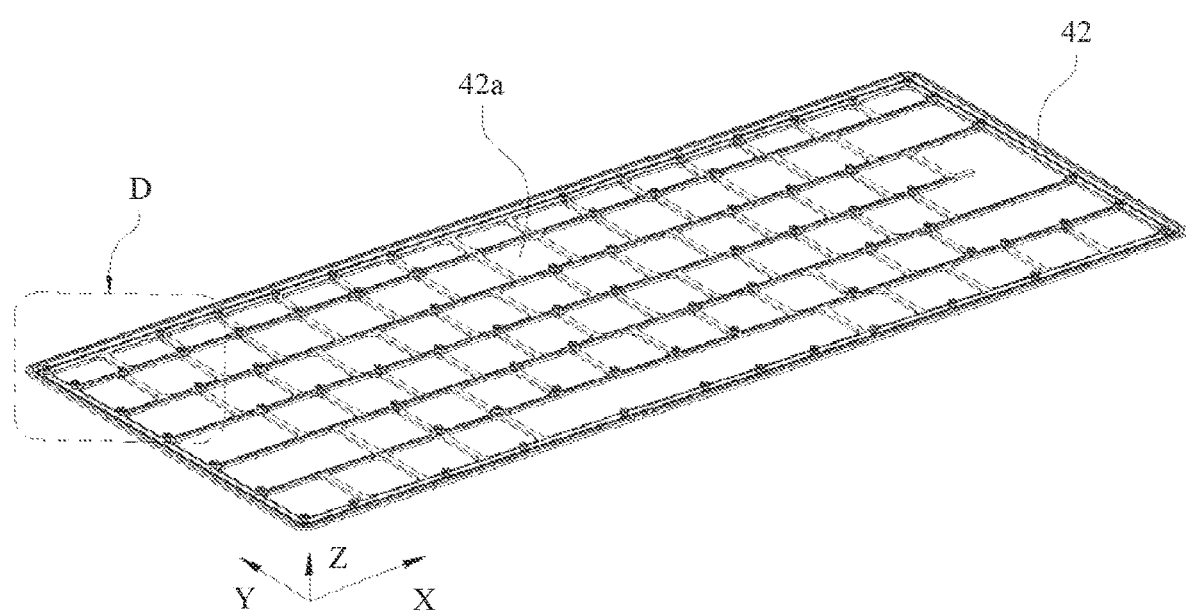
FIG. 9 is a schematic diagram of a partial structure of a keyboard according to an embodiment of this application.
Figure 10:
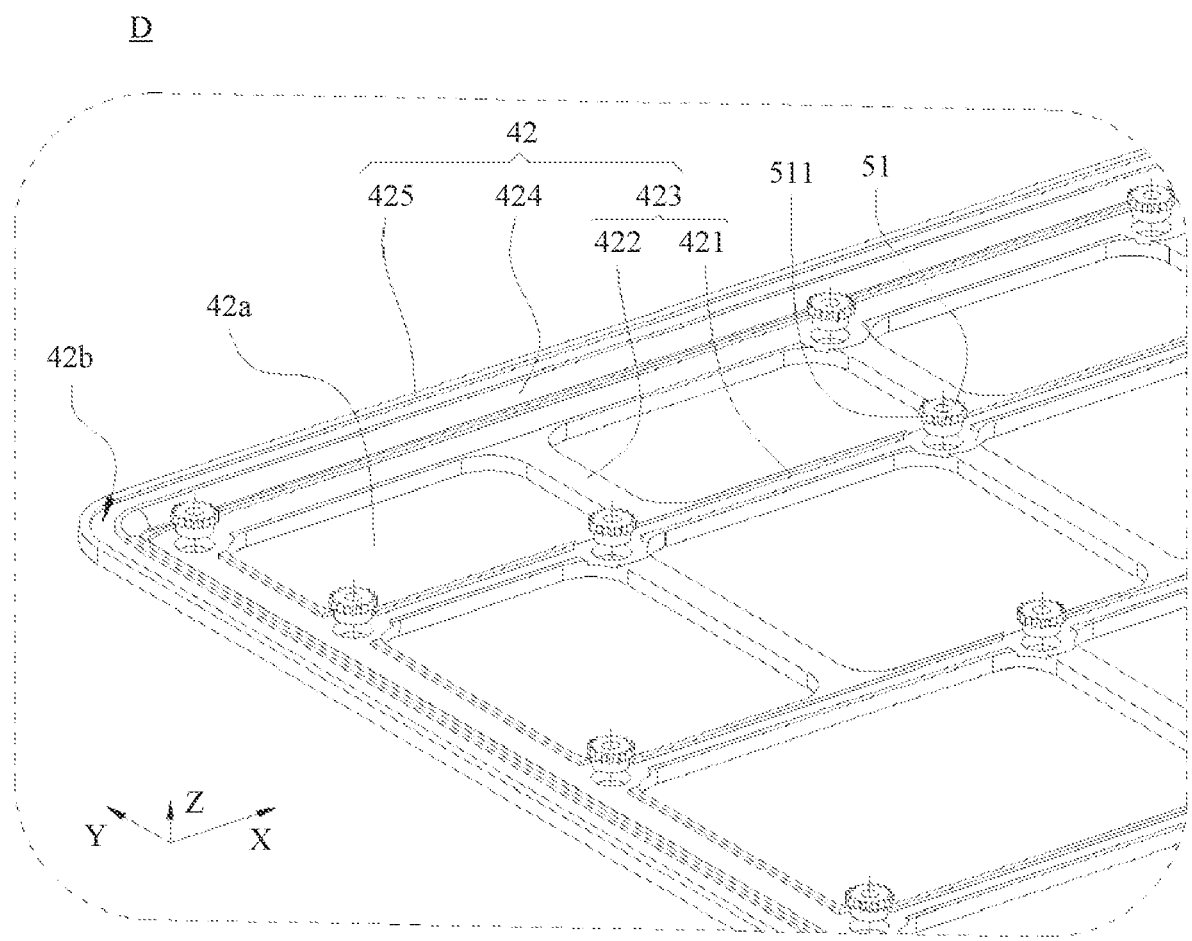
FIG. 10 is an enlarged schematic diagram of a location D in FIG. 9.

In some implementable manners, the first component 51 is a nut. The inner metal frame 42 includes a mounting hole. The first component 51 is inserted into the mounting hole. The first component 51 may be partially located in the mounting hole, and partially located outside the mounting hole, or may be integrally located in the mounting hole. For example, the first component 51 is pressed into the mounting hole of the inner metal frame 42 in an extrusion manner. Referring to FIG. 9 and FIG. 10, a tooth portion 511 may be disposed on a peripheral surface of the first component 51, so that after the first component 51 is pressed into the mounting hole, the tooth portion 511 of the first component 51 may be built into a hole wall of the mounting hole, to improve a bonding force and connection stability between the first component 51 and the inner metal frame 42, reduce a possibility that the first component 51 easily drops from the inner metal frame 42, and further reduce a possibility that the first component 51 rotates in the mounting hole when the first component 51 withstands torque. A plurality of tooth portions 511 are evenly distributed in an annular shape around the first component 51. The second component 52 includes a bolt 521 and a cap portion 522 connected to the bolt 521. The bolt 521 is threaded with the first component 51. The bolt 521 has an external thread, and the first component 51 has an internal threaded that matches the external thread. The cap portion 522 of the second component 52 abuts against the circuit board unit 31, to apply, to the circuit board unit 31, a pressure stress toward the inner metal frame 42. The cap portion 522 of the second component 52 may carry the key board assembly 3, and also limit the keyboard assembly 3, to reduce a possibility that the keyboard assembly 3 moves away from the inner metal frame 42.

In some examples, the circuit board unit 31 includes the circuit board 311, the metal sheet 312, and the backlight module 313. The circuit board 311 includes a first avoidance hole 311a. The metal sheet 312 includes a second avoidance hole 312a. The backlight module 313 includes a third avoidance hole 313a. The first avoidance hole 311a, the second avoidance hole 312a, and the third avoidance hole 313a are aligned, and communicate with each other. The first component 51 is inserted into the first avoidance hole 311a and the second avoidance hole 312a, so that the circuit board unit 31 may be positioned by using the first component 51, to quickly and accurately adjust relative locations of the circuit board unit 31 and the inner metal frame 42. The cap portion 522 of the second component 52 is accommodated in the third avoidance hole 313a and abuts against a surface that is of the metal sheet 312 and that faces away from the circuit board 311. The metal sheet 312 has high rigidity. Therefore, when the second component 52 abuts against the metal sheet 312, and a large pressure stress may be applied to the metal sheet 312, to improve connection stability between the circuit board unit 31 and the inner metal frame 42. The second component 52 and the metal sheet 312 each are of a metal material. Therefore, after the cap portion 522 of the second component 52 abuts against the metal sheet 312, the cap portion 522 is not easily rotated and loosened relative to the metal sheet 312. The cap portion 522 of the second component 52 is accommodated in the third avoidance hole 313a. Space of the third avoidance hole 313a may be used, to help reduce the overall thickness of the keyboard 2. In addition, the backlight module 313 may be avoided, to reduce a possibility that a structure of the backlight module 313 is damaged because the cap portion 522 of the second component 52 abuts against the backlight module 313. For example, the cap portion 522 of the second component 52 is integrally located in the third avoidance hole 313a. A top surface that is of the cap portion 522 of the second component 52 and that faces away from the inner metal frame 42 is flush with an edge of the third avoidance hole 313a formed in the backlight module 313, or a top surface that is of the cap portion 522 of the second component 52 and that faces away from the inner metal frame 42 is lower than an edge of the third avoidance hole 313a formed in the backlight module 313, to reduce a possibility that the cap portion 522 of the second component 52 collides with or scratches an adjacent mechanical part.

As shown in FIG. 10, the inner metal frame 42 includes a transverse spacer 421 and a longitudinal spacer 422 that are connected to each other. For example, the entire keyboard 2 has a length and a width. The transverse spacer 421 extends in a length direction X of the keyboard 2. The longitudinal spacer 422 extends in a width direction Y of the keyboard 2. The transverse spacer 421 and the longitudinal spacer 422 are alternately disposed around the key avoidance hole 43. For example, two longitudinal spacers 422 are disposed on a left side and a right side of each key avoidance hole 43, and two transverse spacers 421 are disposed on an upper side and a lower side. A plurality of transverse spacers 421 and a plurality of longitudinal spacers 422 are classified to form a plurality of second openings 42a. The first component 51 is disposed in an intersection region of the transverse spacer 421 and the longitudinal spacer 422. The intersection region of the transverse spacer 421 and the longitudinal spacer 422 has a large area, and therefore, has high rigidity. When a tapping force impacts on the keyboard assembly 3, an acting force is transmitted to the inner metal frame 42 through the first component 51. The intersection region of the transverse spacer 421 and the longitudinal spacer 422 has high rigidity, and has a strong deformation resistance capability. Therefore, under a pulling action of the first component 51, the intersection region of the transverse spacer 421 and the longitudinal spacer 422 does not easily deform or sink, to ensure that the keyboard 2 can still remain structurally stable when withstanding impact.

In an embodiment in which the inner metal frame 42 includes a second board 423, the transverse spacer 421 and the longitudinal spacer 422 are disposed on the second board 423.

In this embodiment of this application, the outer metal frame 41 and the inner metal frame 42 are detachably connected. The outer metal frame 41 and the inner metal frame 42 each are independently processed and manufactured, and then are assembled. When the outer metal frame 41 or the inner metal frame 42 is repaired subsequently, the outer metal frame 41 and the inner metal frame 42 are separated. After being repaired, the outer metal frame 41 and the inner metal frame 42 are recombined, so that both the outer metal frame 41 and the inner metal frame 42 can be reused, to reduce maintenance difficulty and maintenance costs.

In some implementable manners, the outer metal frame 41 includes an outer surface 41b and an inner surface 41c that are opposite in a thickness direction of the outer metal frame 41. The inner metal frame 42 is stuck to the inner surface 41c. Before the inner metal frame 42 and the outer metal frame 41 are connected, a predetermined location of the outer metal frame 41 or a predetermined location of the inner metal frame 42 is coated with glue or an adhesive tape in advance, and then the inner metal frame 42 and the outer metal frame 41 are stuck and fastened. In a sticking manner, a connection structure may not need to be additionally disposed on the outer metal frame 41 or the inner metal frame 42 to connect and fasten the outer metal frame 41 and the inner metal frame 42, to reduce structural complexity of the outer metal frame 41 or the inner metal frame 42, and reduce processing difficulty of the outer metal frame 41 or the inner metal frame 42. In addition, a quantity of parts used for the keyboard 2 is reduced, to help reduce an assembly process and assembly difficulty of the keyboard 2. Furthermore, a glue coating thickness or a thickness of the adhesive tape is precisely controlled, to help further reduce the overall thickness of the keyboard 2.

There is an annular accommodation cavity (not shown in the figure) between the inner metal frame 42 and the inner surface 41c of the outer metal frame 41. The key board frame assembly 4 further includes a first adhesive member 6 disposed in the annular accommodation cavity. For example, the first adhesive member 6 is an adhesive tape or cured glue. The key avoidance hole 43 is located in a region limited by the annular accommodation cavity. The first adhesive member 6 connects the outer metal frame 41 and the inner metal frame 42. Before the outer metal frame 41 and the inner metal frame 42 are assembled, the predetermined location of the outer metal frame 41 or the predetermined location of the inner metal frame 42 is coated with the glue or the adhesive tape in advance, and then the outer metal frame 41 and the inner metal frame 42 are stuck together. The glue or the adhesive tape is located in the annular accommodation cavity. The annular accommodation cavity may limit the glue or the adhesive tape, to reduce a possibility that the glue spills from space between the outer metal frame 41 and the inner metal frame 42 or that the adhesive tape is misaligned. For example, the annular accommodation cavity is a continuously extending cavity. An annular groove 42b is disposed in an edge region of the inner metal frame 42, so that after the outer metal frame 41 and the inner metal frame 42 are combined, the annular groove 42b and the inner surface 41c of the outer metal frame 41 form the annular accommodation cavity. The second opening 42a of the inner metal frame 42 is located in a region limited by the annular groove 42b.

In some implementable manners, the inner metal frame 42 includes the second board 423, a second side plate 424, and a flange 425. The second side plate 424 and the second board 423 intersect. The flange 425 and the second side plate 424 are connected. The second board 423 includes the transverse spacer 421, the longitudinal spacer 422, and the second opening 42a formed through division of the transverse spacer 421 and the longitudinal spacer 422. The annular groove 42b is disposed on a surface that is of the flange 425 and that faces the outer metal frame 41.

Figure 11:
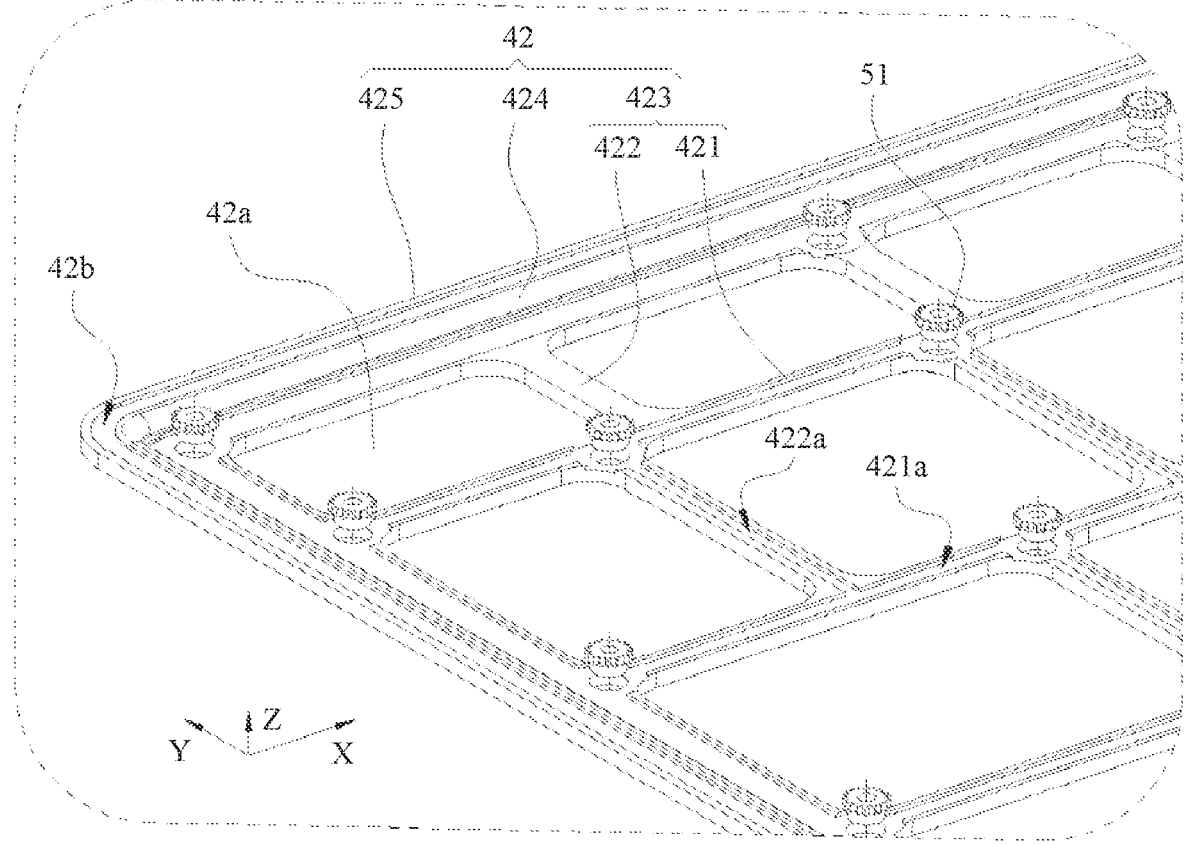
FIG. 11 is a schematic diagram of a partial structure of a keyboard according to another embodiment of this application.
Figure 12:
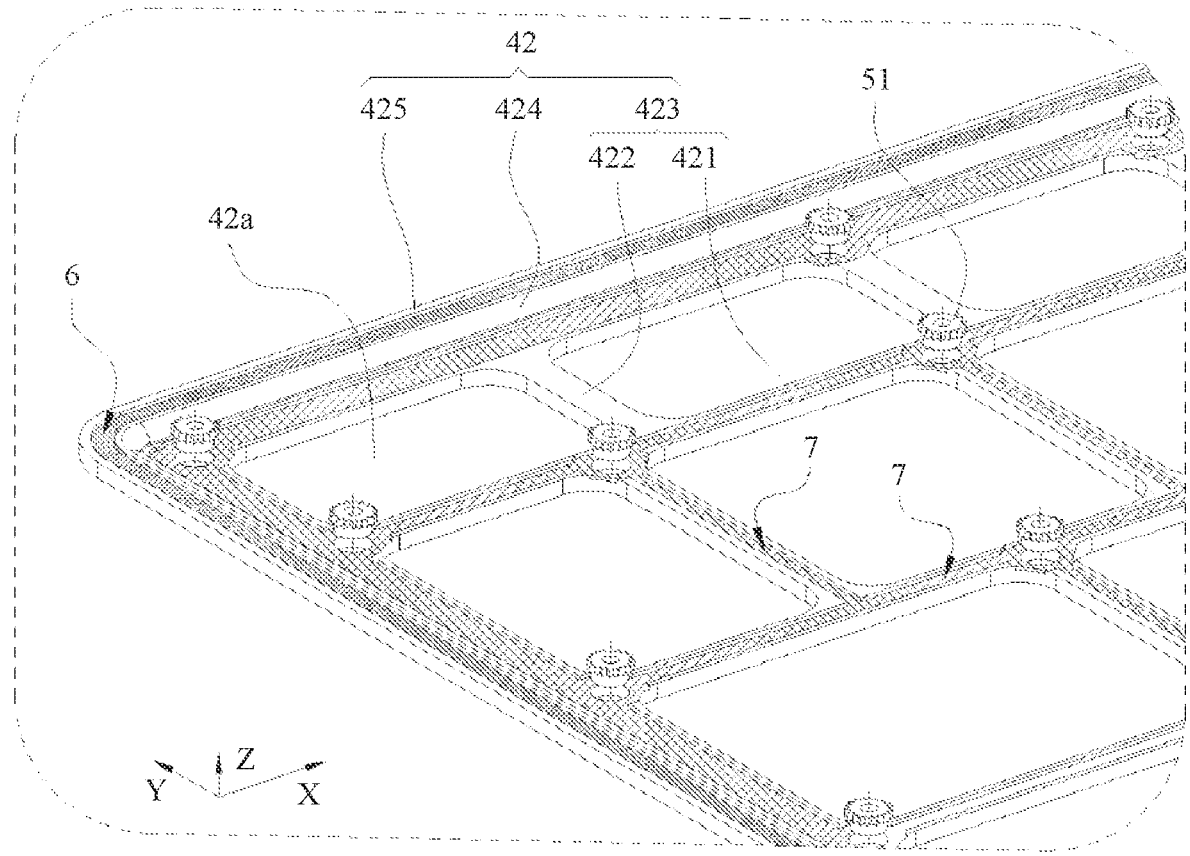
FIG. 12 is a schematic diagram of a partial structure of a keyboard according to still another embodiment of this application.

In some examples, there is a first chamber (not shown in the figure) between the transverse spacer 421 and the inner surface 41c. The keyboard frame assembly 4 further includes a second adhesive member 7 disposed in the first chamber. For example, the second adhesive member 7 is an adhesive tape or cured glue. The second adhesive member 7 connects the outer metal frame 41 and the inner metal frame 42. Before the outer metal frame 41 and the inner metal frame 42 are assembled, the predetermined location of the outer metal frame 41 or the predetermined location of the inner metal frame 42 is coated with the glue or the adhesive tape in advance, and then the outer metal frame 41 and the inner metal frame 42 are stuck together. The glue or the adhesive tape is located in the first chamber. The first chamber may limit the glue or the adhesive tape, to reduce the possibility that the glue spills from space between the outer metal frame 41 and the inner metal frame 42 or that the adhesive tape is misaligned. For example, FIG. 11 and FIG. 12 each schematically show a partial structure of a keyboard 2 according to an embodiment of this application. Referring to FIG. 11 and FIG. 12, a first concave part 421a is disposed on the transverse spacer 421 of the inner metal frame 42, so that after the outer metal frame 41 and the inner metal frame 42 are combined, the first concave part 421a and the inner surface 41c of the outer metal frame 41 form the first chamber. Before the outer metal frame 41 and the inner metal frame 42 are assembled, an inside of the first concave part 421a is coated with glue or an adhesive tape in advance. The first adhesive member 6 and the second adhesive member 7 jointly connect the outer metal frame 41 and the inner metal frame 42, to help further improve connection strength of the outer metal frame 41 and the inner metal frame 42.

In some other examples, there is a second chamber (not shown in the figure) between the longitudinal spacer 422 and the inner surface 41c of the outer metal frame 41. The keyboard frame assembly 4 further includes a second adhesive member 7 disposed in the second chamber. Before the outer metal frame 41 and the inner metal frame 42 are assembled, the predetermined location of the outer metal frame 41 or the predetermined location of the inner metal frame 42 is coated with the glue or the adhesive tape in advance, and then the outer metal frame 41 and the inner metal frame 42 are stuck together. The glue or the adhesive tape is located in the second chamber. The second chamber may limit the glue or the adhesive tape, to reduce the possibility that the glue spills from space between the outer metal frame 41 and the inner metal frame 42 or that the adhesive tape is misaligned. For example, referring to FIG. 11 and FIG. 12, a second concave part 422a is disposed on the longitudinal spacer 422 of the inner metal frame 42, so that after the outer metal frame 41 and the inner metal frame 42 are combined, the second concave part 422a and the inner surface 41c of the outer metal frame 41 form the second chamber. Before the outer metal frame 41 and the inner metal frame 42 are assembled, an inside of the second concave part 422a is coated with glue or an adhesive tape in advance.

It can be understood that there is a first chamber between the transverse spacer 421 and the inner surface 41c, and there is a second chamber between the longitudinal spacer 422 and the inner surface 41c. The key board frame assembly 4 further includes a second adhesive member 7 disposed in the first chamber and the second chamber. The first chamber and the second chamber may communicate. In the embodiment in which the first component 51 is a nut, the first component 51 may be disposed at an intersection of the first chamber and the second chamber, and an end surface that is of the first component 51 and that faces the outer metal frame 41 is exposed from the inner metal frame 42, so that glue or an adhesive tape can connect the first component 51 and the outer metal frame 41. When the first component 51 suffers from a tensile stress of pulling the first component 51 away from the outer metal frame 41, a part that is of the outer metal frame 41 and that corresponds to the first component 51 may exert an opposite acting force on the first component 51, to further reduce a possibility that the first component 51 and the inner metal frame 42 move away from the outer metal frame 41.

An embodiment of this application provides a method for manufacturing a key board 2, including:

providing a first board, and processing and manufacturing the first board, to form an outer metal frame 41 including a first opening 41a;

providing a second board, and processing and manufacturing the second board, to form an inner metal frame 42 including a second opening 42a;

connecting the outer metal frame 41 and the inner metal frame 42, where the first opening 41a and the second opening 42a are correspondingly disposed, and the first opening 41a and the second opening 42a communicate to form a key avoidance hole 43;

providing a keyboard assembly 3 including a circuit board unit 31 and a key 32, where the keyboard assembly 3 is positioned on the inner metal frame 42, the key 32 of the keyboard assembly 3 is aligned with the key avoidance hole 43, and the circuit board unit 31 of the keyboard assembly 3 is located on a side that is of the inner metal frame 42 and that faces away from the outer metal frame 41; and connecting and combining the keyboard assembly 3 and the inner metal frame 42, to form the keyboard 2.

In the method for manufacturing a keyboard 2 in this embodiment, the keyboard 2 in the foregoing embodiment may be manufactured.

In the descriptions of the embodiments of this application, it should be noted that unless otherwise specified or limited, terms "mount", "communicate", and "connect" shall be understood in a broad sense, for example, may be a fixed connection, may be an indirect connection by using an intermediate medium, or may be a connection between insides of two elements or an interaction relationship between two elements. A person of ordinary skill in the art may understand specific meanings of the foregoing terms in the embodiments of this application based on a specific situation.

The apparatus or element referred to in or implied in the embodiments of this application needs to have a specific orientation, be constructed and operated in a specific orientation, and therefore cannot be construed as a limitation on the embodiments of this specification. In the descriptions of the embodiments of this application, "a plurality of" means two or more, unless otherwise specifically specified.

The terms "first", "second", "third", "fourth", and the like (if existent) in the specification, claims, and accompanying drawings of the embodiments of this application are used to distinguish between similar objects, but are not necessarily used to describe a particular order or sequence. It should be understood that the data used in such a way is interchangeable in proper situations, so that the embodiments of the embodiments of this application described herein can be implemented, for example, in a sequence other than those illustrated or described herein. In addition, the terms "include", "have", and any variation thereof are intended to cover non-exclusive inclusions. For example, a process, a method, a system, a product, or a device that includes a series of steps or units is not necessarily limited to those steps or units that are clearly listed, but may include other steps or units that are not clearly listed or are inherent to the process, method, product, or device.

Unless otherwise specified, "a plurality of" in this specification indicates two or more. The term "and/or" in this specification describes only an association relationship between associated objects and represents that three relationships can exist. For example, "A and/or B" can represent the following three cases: Only A exists, both A and B exist, and only B exists. In addition, the character "/" in this specification usually indicates an "or" relationship between the associated objects. In a formula, the character "/" indicates that the associated objects are in a "division" relationship.

It can be understood that various numeric numbers used in the embodiments of this application are merely described for easy differentiation, and are not intended to limit the scope of the embodiments of this application.

It should be understood that, in the embodiments of this application, sequence numbers of the foregoing processes do not mean execution sequences. The execution sequences of the processes should be determined based on functions and internal logic of the processes, and should not be construed as any limitation on the implementation processes of the embodiments of this application.

What is claimed is:

1. A keyboard, comprising:
an adaptation piece comprising a first component and a second component;
a keyboard assembly comprising a key and a circuit board assembly; and
a keyboard frame assembly comprising an outer metal frame, an inner metal frame, and a key avoidance hole, wherein the inner metal frame is connected to the outer metal frame, the key avoidance hole penetrates through the outer metal frame and the inner metal frame, the keyboard assembly is connected to the inner metal frame, the inner metal frame is located between the outer metal frame and the keyboard assembly, the inner metal frame is configured to carry the keyboard assembly, and the key is disposed in correspondence with the key avoidance hole;
wherein the keyboard assembly is detachably connected to the inner metal frame; and
wherein the first component is disposed on the inner metal frame, and the first component and the second component are fastened to connect the circuit board assembly and the inner metal frame.

2. The keyboard according to claim 1, wherein the key is disposed on the circuit board assembly, the circuit board assembly is disposed on a side that is of the inner metal frame and that faces away from the outer metal frame, and the circuit board assembly is detachably connected to the inner metal frame.

3. The keyboard according to claim 2, wherein the circuit board assembly is detachably connected to the inner metal frame by using the adaptation piece.

4. The keyboard according to claim 2, wherein the circuit board assembly comprises a circuit board, a metal sheet, and a backlight assembly, the circuit board is disposed on a side that is of the metal sheet and that faces the inner metal frame, the backlight assembly is disposed on a side that is of the metal sheet and that faces away from the inner metal frame, the circuit board comprises a first avoidance hole, the metal sheet comprises a second avoidance hole, the backlight assembly comprises a third avoidance hole, the first component is inserted into the first avoidance hole and the second avoidance hole, and the cap portion is accommodated in the third avoidance hole and abuts against a surface that is of the metal sheet and that faces away from the circuit board.

5. The keyboard according to claim 3, wherein the circuit board assembly comprises a circuit board, a metal sheet, and a backlight assembly, the circuit board is disposed on a side that is of the metal sheet and that faces the inner metal frame, the backlight assembly is disposed on a side that is of the metal sheet and that faces away from the inner metal frame, the circuit board comprises a first avoidance hole, the metal sheet comprises a second avoidance hole, the backlight assembly comprises a third avoidance hole, the first component is inserted into the first avoidance hole and the second avoidance hole, and the cap portion is accommodated in the third avoidance hole and abuts against a surface that is of the metal sheet and that faces away from the circuit board.

6. The keyboard according to claim 2, wherein the first component is threaded with the second component.

7. The keyboard according to claim 6, wherein the first component is a nut, the inner metal frame comprises a mounting hole, the first component is inserted into the mounting hole, the second component comprises a bolt and a cap portion connected to the bolt, the bolt is threaded with the first component, and the cap portion abuts against the circuit board assembly to apply, to the circuit board assembly, a pressure stress toward the inner metal frame.

8. The keyboard according to claim 7, wherein the circuit board assembly comprises a circuit board, a metal sheet, and a backlight assembly, the circuit board is disposed on a side that is of the metal sheet and that faces the inner metal frame, the backlight assembly is disposed on a side that is of the metal sheet and that faces away from the inner metal frame, the circuit board comprises a first avoidance hole, the metal sheet comprises a second avoidance hole, the backlight assembly comprises a third avoidance hole, the first component is inserted into the first avoidance hole and the second avoidance hole, and the cap portion is accommodated in the third avoidance hole and abuts against a surface that is of the metal sheet and that faces away from the circuit board.

9. The keyboard according to claim 6, wherein the circuit board assembly comprises a circuit board, a metal sheet, and a backlight assembly, the circuit board is disposed on a side that is of the metal sheet and that faces the inner metal frame, the backlight assembly is disposed on a side that is of the metal sheet and that faces away from the inner metal frame, the circuit board comprises a first avoidance hole, the metal sheet comprises a second avoidance hole, the backlight assembly comprises a third avoidance hole, the first component is inserted into the first avoidance hole and the second avoidance hole, and the cap portion is accommodated in the third avoidance hole and abuts against a surface that is of the metal sheet and that faces away from the circuit board.

10. The keyboard according to claim 1, wherein the first component is threaded with the second component.

11. The keyboard according to claim 10, wherein the first component is a nut, the inner metal frame comprises a mounting hole, the first component is inserted into the mounting hole, the second component comprises a bolt and a cap portion connected to the bolt, the bolt is threaded with the first component, and the cap portion abuts against the circuit board assembly to apply, to the circuit board assembly, a pressure stress toward the inner metal frame.

12. The keyboard according to claim 10, wherein the outer metal frame and the inner metal frame are detachably connected.

13. The keyboard according to claim 10, wherein the inner metal frame comprises a transverse spacer and a longitudinal spacer, the transverse spacer and the longitudinal spacer are alternately disposed around the key avoidance hole, and the first component is disposed in an intersection region of the transverse spacer and the longitudinal spacer.

14. The keyboard according to claim 1, wherein the first component is a nut, the inner metal frame comprises a mounting hole, the first component is inserted into the mounting hole, the second component comprises a bolt and a cap portion connected to the bolt, the bolt is threaded with the first component, and the cap portion abuts against the circuit board assembly to apply, to the circuit board assembly, a pressure stress toward the inner metal frame.

15. The keyboard according to claim 1, wherein the inner metal frame comprises a transverse spacer and a longitudinal spacer, the transverse spacer and the longitudinal spacer are alternately disposed around the key avoidance hole, and the first component is disposed in an intersection region of the transverse spacer and the longitudinal spacer.

16. An electronic device, comprising the keyboard according to claim 1.

17. The keyboard according to claim 1, wherein the outer metal frame and the inner metal frame are detachably connected.

18. The keyboard according to claim 17, wherein the outer metal frame comprises an outer surface and an inner surface, and the inner metal frame is stuck to the inner surface.

19. The keyboard according to claim 18, wherein there is an annular accommodation cavity between the inner metal frame and the inner surface, the keyboard frame assembly further comprises a first adhesive member disposed within the annular accommodation cavity, the key avoidance hole is located within a region limited by the annular accommodation cavity, and the first adhesive member connects the outer metal frame and the inner metal frame.

20. The keyboard according to claim 18,
wherein the inner metal frame comprises a transverse spacer and a longitudinal spacer, and the transverse spacer and the longitudinal spacer are alternately disposed around the key avoidance hole;
wherein:
there is a first chamber between the transverse spacer and the inner surface, and the keyboard frame assembly further comprises a second adhesive member disposed in the first chamber; or
there is a second chamber between the longitudinal spacer and the inner surface, and the keyboard frame assembly further comprises a second adhesive member disposed in the second chamber; or
there is a first chamber between the transverse spacer and the inner surface, there is a second chamber between the longitudinal spacer and the inner surface, and the keyboard frame assembly further comprises a second adhesive member disposed in the first chamber and the second chamber; and
wherein the second adhesive member connects the outer metal frame and the inner metal frame.

* * * * *